United States Patent [19]

Zansky

[11] 4,370,600
[45] Jan. 25, 1983

[54] TWO-WIRE ELECTRONIC DIMMING BALLAST FOR FLUORESCENT LAMPS

[75] Inventor: Zoltan Zansky, Roseville, Minn.

[73] Assignee: Honeywell Inc., Minneapolis, Minn.

[21] Appl. No.: 210,651

[22] Filed: Nov. 26, 1980

[51] Int. Cl.³ .................... H05B 41/29; H05B 41/392
[52] U.S. Cl. .................................... 315/244; 315/106;
315/209 R; 315/239; 315/243; 315/291;
315/DIG. 4; 315/DIG. 7
[58] Field of Search .................... 315/106, 209 R, 225,
315/232, 239, 244, 291, DIG. 4, DIG. 7, 97, 98,
243

[56] References Cited

U.S. PATENT DOCUMENTS

| | | | |
|---|---|---|---|
| 3,247,422 | 4/1966 | Schultz | 315/206 |
| 3,969,652 | 7/1976 | Herzog | 315/224 |
| 4,017,782 | 4/1977 | Wheeler | 321/2 |
| 4,042,852 | 8/1977 | Zaderes et al. | 315/97 |
| 4,163,925 | 8/1979 | Gyursanszky | 315/276 |
| 4,207,497 | 6/1980 | Capewell et al. | 315/96 |
| 4,207,498 | 6/1980 | Spira | 315/97 |
| 4,210,846 | 7/1980 | Capewell et al. | 315/121 |

OTHER PUBLICATIONS

Cohen, Charles, "Transistor Ballast Cuts Power Loss", *Electronics*, Sep. 13, 1979, pp. 78, 80.
Haver, Robert J., "The ABC's of DC to AC Inverters", Motorola Semiconductor Products, Inc., Apr. 1975.
Roddam, Thomas, "Transistor Inverters and Converters", Chapter 10 of *Design of Solid State Power Supplies*, Princeton, N.J., date unknown.
Haver, Robert J., "The Verdict Is In: Solid-State Fluorescent Ballasts are Here", *EDN*, Nov. 15, 1976.
Connolly, Arthur P., "Resonant Bridge Inverter", General Electric Co., NY, (1970).

*Primary Examiner*—Eugene R. La Roche
*Attorney, Agent, or Firm*—Charles G. Mersereau

[57] ABSTRACT

A low cost, high frequency, solid-state dimmable fluorescent ballast is disclosed which utilizes a resonant bridge inverter to provide high frequency sinusoidal power to the lamps. One embodiment of the invention includes auxiliary windings connected to the filaments of the lamps to be powered which utilize the inductance of the resonant bridge inductor coil to maintain the voltage across the filaments during dimming. A clamping circuit or auxiliary tuned circuit may be provided to prevent damage due to an over-voltage and over-current condition upon removal of a lamp during operation of the system. In an alternative embodiment, the auxiliary windings, are replaced by capacitors across each of the lamps to be powered. This also eliminates the need for the clamping circuit. If desired, a current splitting capacitance system may be used. Pulse width modulation of the inverter drive or variable AC or DC power supply input may be used to accomplish dimming.

23 Claims, 7 Drawing Figures

TWO-WIRE ELECTRONIC DIMMING BALLAST FOR FLUORESCENT LAMPS

CROSS-REFERENCE TO RELATED APPLICATIONS

Cross-reference is made to two related applications filed of even date herewith and assigned to the same assignee as the present application. The first Ser. No. 210,650, is entitled "Two-wire Electronic Dimming Ballast for Gaseous Discharge Lamps" and has the same inventorship as the present application. The second related application, Ser. No. 210,649, is entitled "Two-wire Ballast for Fluorescent Tube Dimming," was co-invented by Zoltan Zansky, the inventor of the present application.

The first cross-referenced application concerns a high frequency electronic ballast dimming arrangement which utilizes a pulse width modulated input to a push-pull or half-bridge inverter in combination with the employment of secondary windings in the transformer which utilize the leakage inductance of the transformer to maintain constant cathode voltage during dimming. The second cross-referenced application concerns simplifying a conventional dimming ballast by eliminating the external inductor or choke coil associated with maintaining the desired cathode filament voltage and replacing the function of the choke coil with secondary windings in the transformer which utilize the natural leakage inductance of the transformer to obtain the desired results. The present invention, on the other hand, concerns a high frequency electronic ballast dimming arrangement which uses a resonant bridge inverter which may be dimmed by applying a variable pulse width modulated drive to the switching transistors or by variation of the AC source voltage to a rectification system. Thus, the resonant bridge inverter uses a resonant series inductance/capacitance to provide direct lamp input. The main secondary of the transformer is eliminated. Constant cathode filament voltage is maintained during dimming by the use of auxiliary windings in the inductor or by parallel capacitors connected across the lamps.

FIELD OF THE INVENTION

The present invention relates generally to the field of two-wire, high frequency electronic ballasts for powering gas discharge tubes of the fluorescent type and the like and, more particularly, to a simplified two-wire electronic ballast arrangement which utilizes a resonant bridge inverter-fed system in a manner which allows essentially full range dimming.

DESCRIPTION OF THE PRIOR ART

Typical fluorescent tubes comprise a sealed cylinder of glass having a heating filament at either end and filled with a gas such as mercury vapor. The supplied voltage is utilized to heat the filaments to a point where a thermoionic emission occurs such that an arc can be struck across the tube casing the gas to radiate. Initial radiation given off by gases such as mercury vapor is of a short wavelength principally in the ultraviolet end of the spectrum and thus little visible light is produced. In order to overcome this problem, the inside of the tube is coated with a suitable phosphor which is activated by the ultraviolet radiation and, in turn, emits visible light of a color that is characteristic of the particular phosphor or mixture of phosphors employed to coat the tube. An important consideration in the operation of such fluorescent tubes is concerned with the fact that in order to sustain the arc across the tubes, the filament voltage must be maintained to a predetermined level. It is maintaining this predetermined voltage level and, at the same time, reducing the cost of components required to do so which poses the greatest problem in devising a scheme for dimming the output of the fluorescent tubes in a solid state ballast system to produce an energy-saving, light-dimming arrangement.

Solid-state ballasts must provide the same primary function as the conventional core-coil ballasts well known in the art, i.e. they must start and operate the lamp safely. Solid-state ballasts normally convert conventional 60Hz AC to DC and then invert the DC to drive the lamps at a much higher frequency. That frequency generally is in the 10 to 50KHz range. It has been found that fluorescent lamps which are operated at these higher frequencies have a higher energy efficiency than those operated at 60Hz, and they exhibit lower power losses because of the non-magnetic nature of the reactive circuit components. In addition, at high frequencies, annoying 60 cycle "flickering" and ballast hum are eliminated.

One type of prior art electronic ballasts employs resonant bridge inverters, inverters which include a resonant L-C circuit having an inductor and tuning capacitor to obtain the proper high frequency sine wave output. Examples of such prior art electronic ballasts are shown in the article entitled "Resonant Bridge Inverter" by Arthur P. Connolley published by the Semiconductor Products Department of the General Electric Company in 1970. The circuits disclosed in that reference include a resonant bridge inverter system to supply high frequency sinusoidal current across a resistive load with SCR's as the main switching devices. Resonant bridge inverter power supplies involve relatively simple circuitry and eliminate the need for a ballast transformer thereby reducing both the amount of ferrite core material and copper wire.

While that and similar systems have been successful in increasing the efficiency of electronic lamp ballasts to a certain degree, dimming of the fluorescent or other gas discharge lamps has been either impossible or extremely limited because no provision is made to maintain the necessary cathode filament voltage at the lamps during periods of reduced power input. With the present emphasis on saving energy, the need for dimmable systems is great.

SUMMARY OF THE INVENTION

According to the present invention, problems of dimming limitations associated with prior art, high frequency, solid-state ballasts which utilize resonant bridge inverters are solved by the provision of an low cost arrangement which allows essentially full range dimming of the lamps. One embodiment of the present invention includes auxiliary windings connected to the filaments of the lamps to be powered which utilize the inductance of the inductor coil to maintain the voltage across the filaments. A clamping circuit may be provided to prevent damage due to an over-voltage and over-current condition upon removal of a lamp during operation. Pulse width modulation of the inverter drive or variable AC or DC power supply input may be used to accomplish dimming.

In an alternate embodiment, the auxiliary windings are replaced by capacitors across each of the lamps to be powered. This also eliminates the need for the clamping circuit.

DESCRIPTION OF THE DRAWINGS

In the drawings wherein like numerals are utilized to denote like parts throughout the same:

FIG. 7 illustrates a typical dimming circuit for use in conjunction with the solid-state arrangement of the present invention.

DESCRIPTION OF THE PREFERRED EMBODIMENT

Figure 1:
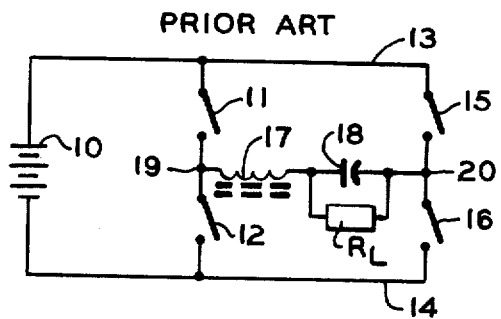

FIG. 1 depicts a prior art power supply including a high frequency, solid-state, resonant bridge inverter including a power supply or source of direct current 10 which may be provided by rectified AC, or the like, in a well-known manner. Switches 11 and 12 are connected in series between conductors 13 and 14 and in parallel with series switches 15 and 16. An inductance coil 17 in series with capacitor 18 are connected between the juncture of switches 11 and 12 and the juncture of switches 15 and 16 at 19 and 20, respectively.

The switches 11, 12, 15, and 16 are comprised of an SCR and diode connected in inverse parallel relation and the resonant bridge inverter of FIG. 1 makes use of the SCR's as the main switching devices. Commutation of SCR's is accomplished by the L-C circuit including inductor 17 and capacitor 18 which are designed to resonate at the natural frequency of the circuit. In operation, switches 11 and 16 are turned simultaneously creating a resonant current which flows through the SCR/diode pair. A series resonant circuit is established when either set of diagonally opposite switching legs are conductive. As the alternate pairs of SCR's are gated on, i.e. first switches 11 and 16, followed by switches 15 and 12, a resonant system is established between the capacitance and inductance in the common branch of the bridge connected between 19 and 20. The current in each bridge leg resonates sinusoidally, and, as energy is exchanged between the inductor 17 an capacitor 18, the SCR's and diodes alternately conduct current. Of course, by alternately turning on the pairs of SCR's which are diagonally opposite a sinusoidal voltage, will result across the capacitor and will be, consequently, imposed on the load.

The load of FIG. 1 may be one or more fluorescent tubes, or a similar type of gas discharge lamp. It should be noted that with the circuit of FIG. 1, although the conventional prior art transformer is not required, dimming of the lamps comprising the load is not possible because there is no provision made to maintain the required cathode heating filament voltages during a change in the circuit voltage. Also there is no provision for changing input voltage to the inverter or the lamp load.

Figure 2:
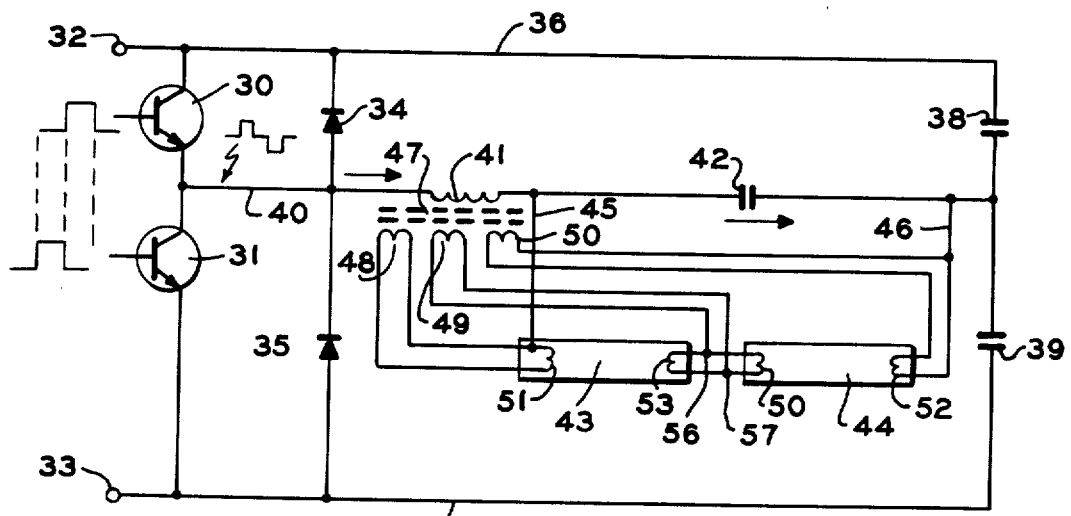
FIG. 2 is a schematic circuit diagram of one embodiment of the present invention.

In FIG. 2 there is shown a high frequency power supply including a resonant bridge inverter which includes provision for dimming of the fluorescent tubes or other gas discharge lamps comprising the load by varying the pulse width of the pulse width modulated drive at the input of the transistors. The system includes transistors 30 and 31 connected in series and supplied with rectified DC current as through terminals 32 and 33 which may be full wave rectified AC power supply. The arrangement may also include diodes 34 and 35 as shown connected across conductors 36 and 37 for transient protection if required. Also connected across the pair of conductors 36 and 37 are a pair of filter capacitors 38 and 39. The junctures of transistors 30 and 31 and diodes 34 and 35 are connected together as by conductor 40. An inductor coil 41 along with capacitor 42 are connected in series between the juncture of diodes 34 and 35 and the juncture of capacitors 38 and 39. The load consisting of fluorescent tubes 43 and 44 is connected in series across the capacitor 42 via conductors 45 and 46. Associated with the core 47 of the coil 41 are auxiliary filament windings 48, 49, and 50. The auxiliary winding 48 is connected across filament 51 of fluorescent tube 43, the auxiliary winding 50 is connected across filament 52 of fluorescent tube 44, and the auxiliary winding 49 is connected across filaments 53 and 54 of fluorescent tubes 43 and 44, respectively, in parallel, and filaments 50 and 53 are connected together at 54 and 55.

The circuit of FIG. 2 operates to provide a sinusoidal input to the fluorescent tubes 43 and 44. The output of transistors 30 and 31 resonates at the natural resonant frequency of the L-C common leg including inductor coil 41 and capacitor 42 to provide a sinusoidal voltage across capacitor 42 which is also imposed on the load.

The auxiliary coils 48, 49, and 50 are located in the inductor coil 41 with ferrite core 47 such that the voltage supplied to the filaments of the fluorescent lamps remains substantially constant throughout the dimming range of the lamps of the system as explained below.

Figure 3:
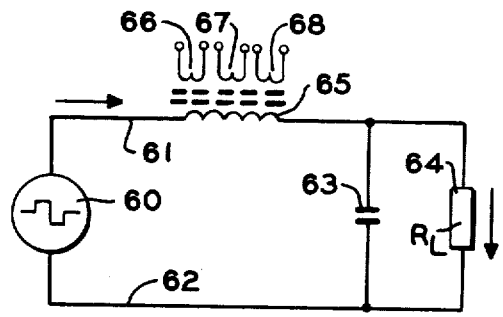
FIG. 3 is a simplified schematic diagram of the circuit of FIG. 2.

A simpler schematic circuit diagram of FIG. 2 is shown in FIG. 3 and includes a source of pulse width modulated AC current 60 connected between conductor 61 and 62 along with parallel connected capacitor 63 and load 64. The inductor coil is represented by 65 and the auxiliary windings are represented by 66, 67, and 68, respectively.

The operation of the basic circuit arrangement of the invention may be further described by certain equations in which:

$U_1$ = Amplitude of the output fundamental sine wave of the pulse width modulated AC square wave (volts)

$U_2$ = Amplitude of the tuned sinusoidal voltage at the load (volts)

R = Load resistance (ohms)

L = Inductance of coil 65 (henrys)

$\phi$ = Tuned frequency of the square wave or sinusoidal wave (Hz×2)

C = Series capacitance (farads)

I = Current (amperes)

$\omega$ = Phase shift angle (degrees)

$P_R$ = Power consumed at load (watts)

The equations describing the circuit may be written as follows:

$$|U_2| = \frac{U_1 R}{\omega L} \;;\; \phi = -90° \qquad (1)$$

$$|I| = \frac{U_1}{L} \sqrt{(RC_1)^2 + \frac{1}{\omega^2}} \;;\; \phi = \text{arctg} \; -\frac{1}{\omega RC} \qquad (2)$$

$$P_R = (U_1 \omega C) R^2 = \left(\frac{U_1}{\omega L}\right)^2 R \qquad (3)$$

The characteristics associated with dimming of a typical gas discharge lamp, in this case 2 fluorescent tubes (40 watts rapid start) are connected in series, is depicted in Table I.

TABLE I

| Light Level | % | 100 | 80 | 60 | 40 | 20 | 10 |
|---|---|---|---|---|---|---|---|
| R of 2 tubes in series | KΩ | 0.6 | 0.9 | 1.4 | 2.5 | 5.4 | 1.2 |
| PLoad | Watts | 66 | 53 | 40 | 26 | 13 | 6.8 |

When the lamps are dimmed by varying the average amplitude of the output square wave as by pulse width modulation of the inverter or by decreasing the amplitude of the input AC voltage, this produces a proportional variation in the amplitude of the output sine wave $U_1$. As can be seen in Table I, however, as the light level is dimmed, the resistance of the lamps increases while the load on the tuned circuit decreases. The relation between the increase in lamp resistance and the decrease in voltage $U_1$ is such that the current I through the inductor L as at 65 (FIG. 3) remains substantially constant all though the dimming range from 100% to 10% as can be seen from Equation 2 and Table 1. More importantly, this means that the voltage in the auxiliary secondary windings as at 66, 67, and 68 remains substantially constant throughout the dimming range to maintain the proper cathode filament heating voltage at the cathodes of the lamps.

Figure 4:
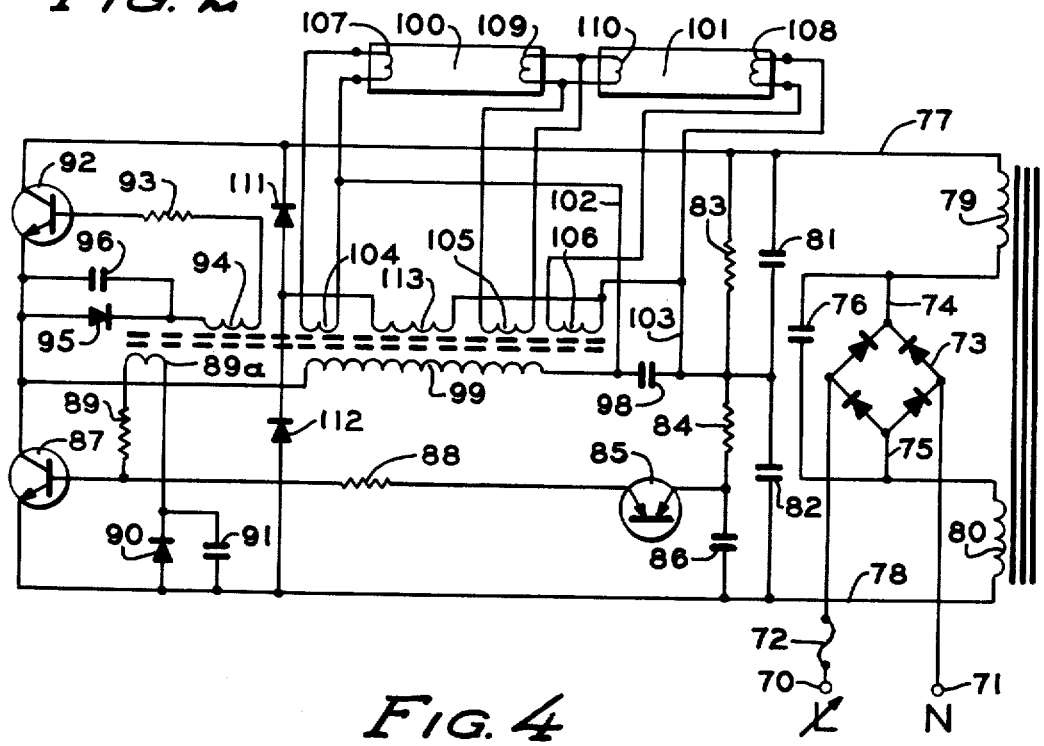
FIG. 4 is an alternate embodiment of the invention of FIG. 2.

An alternative solid-state embodiment of that depicted in FIG. 2 of a working solid-state ballast is shown in FIG. 4. This system includes variable AC input terminals 70 and 71 having suitable circuit protection as by a fuselink 72. Connected across the input terminals is a full wave rectifier bridge 73 having alternate outputs at 74 and 75, respectively. Capacitor 76 may be connected across the output of the full wave bridge 73 to suppress radio frequency interference, if desired. Rectified DC output is connected across conductors 77 and 78 through respective filter inductors 79 and 80. The rectified DC filtering system further includes filter capacitors 81 and 82 along with shunt resistors 83 and 84.

The inverter system is provided with triggering element 85, which may be a silicon unilateral switch, diac, or the like, which operates in conjunction with a capacitor 86 to trigger the base of transistor 87 through resistor 88. The emitter of the first oscillator transistor 87 is connected to a positive feedback coil arrangement which includes feedback coil 89 connected in series with a diode 90 which, in turn, is connected in parallel with a capacitor 91. Similarly, the second oscillator transistor 92 is provided with a positive feedback coil arrangement located between the emitter and the base including a current limiting resistor 93, feedback coil 94 which are connected in series with a diode 95 which, in turn, is connected in parallel with capacitor 96. The common juncture between capacitors 81 and 82 and resistors 83 and 84 is connected together, and the main coil winding 99, along with capacitor 98 are connected in series between the juncture of the resistors 83 and 84 and a junction between the collector of transistor 87 and the emitter of transistor 92. The collector of transistor 92 and the emitter of transistor 87 are also connected across the DC conductors 77 and 78.

The arrangement of FIG. 4 is one designed to supply power to two fluorescent tubes 100 and 101 connected in series across the capacitor 98 via a connecting conductors 102 and 103. The lamp powering system further includes auxiliary windings 104, 105, and 106. The auxiliary winding 104 is connected across filament 107 of tube 100, and the auxiliary winding 106 is connected across filament winding 108 of tube 101 as shown. The auxiliary winding 105 is connected across both filaments 109 and 110 of the tubes 100 and 101, respectively, as shown. According to the explanation and equations above, auxiliary filament windings 104, 105, and 106 maintain an essentially constant voltage at the lamp filaments despite dimming by variation in the AC input to the system.

In operation, the oscillation of the resonant bridge inverter is initiated by the charging of capacitor 86 through resistor 84. When the triggering voltage value is reached, the triggering element 85 discharges capacitor 86 through the resistor 88 into the base of transistor 87, and the resonant system including transistors 87 and 92 begins to oscillate at the frequency of the L-C leg. Subsequent discharges from capacitor 86 through element 88 are too small to affect the inverter oscillation once the oscillation has begun. The system, then, provides a sine wave voltage across capacitor 98 at the natural oscillating frequency of the L-C circuit including inductor 99 and capacitor 98 which, in turn, is supplied to the fluorescent tubes 100 and 101.

To protect the capacitor 98 along with transistors 87 and 92 from damage caused by an over-voltage and over-current condition when one of the tubes 100 or 101 is removed while the system is operating, a clamping circuit is provided which includes series connected diodes 111 and 112 along with an additional coil 113 which is connected from the juncture of the two diodes to conductor 103. In this manner, whenever an open circuit appears between the sets of filaments of the tubes 100 or 101, the two diodes 111 and 112 along with the coil 113 "clamp" the voltage to the level of the input capacitors 81 and 82 of the DC power supply.

Figure 5:
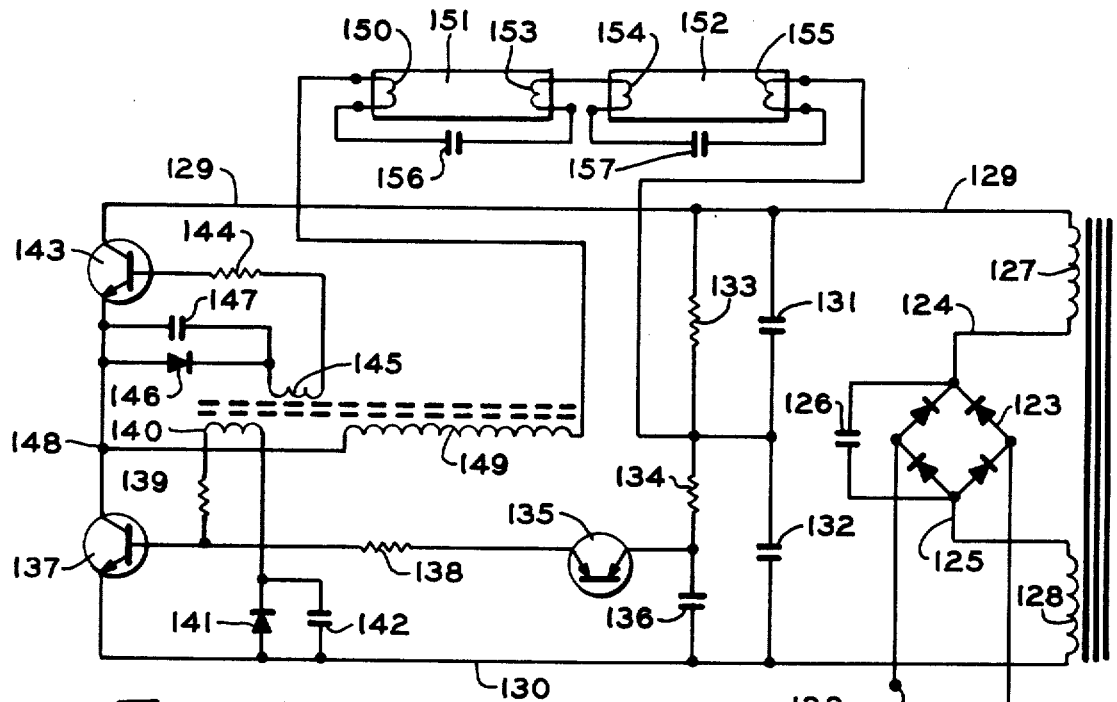

FIG. 5 depicts an alternate, simplified embodiment of the arrangement of FIG. 4. This system includes a source of variable AC power connected to terminals 120 and 121 with suitable current limiter 122 which, in turn, are connected to full wave bridge 123 having outputs at 124 and 125. As in the case of FIG. 4, a radio frequency interference filter capacitor 126 may be provided. The alternate rectified half waves 124 and 125 on the bridge 123 are connected through filter inductors 127 and 128 to respective output lines 129 and 130. Filter capacitors 131 and 132 along with shunt resistors 133 and 134 complete the DC filtering system. As in the case of FIG. 4, the circuit is self-oscillating and further includes a triggering element 135 with triggering capacitor 136 connected with the base of first oscillating transistor 137 through current limiting resistor 138. A positive feedback coil system is connected between the emitter and the base of transistor 137 which includes resistor 139, coil 140 connected in series with diode 141 and capacitor 142 connected in parallel with diode 141.

A second oscillating transistor 143 includes a similar positive feedback loop connected between its base and emitter including, in series, resistor 144, coil 145, and diode 146 connected in parallel with capacitor 147. The transistors 137 and 143 are connected in series across the conductors 129 and 130 and have a common juncture 148 between the collector of transistor 137 and the emitter of transistor 143.

The resonant inductor coil of the system 149 is connected between the juncture 148 and the first terminal of filament 150 of the first fluorescent tube 151 which is connected in series with a second tube 152. The tube 151 further includes a second filament 153 which connects with a filament 154 of tube 152 which also contains a final filament 155 which is connected in turn to the juncture between resistors 133 and 134. A tuning capacitor 156 is connected across tube 151, and a tuning capacitor 157 is connected across tube 152. Thus, the current through capacitors 156 and 157 which remains relatively constant throughout the dimming range, as explained above, passes through all filaments in turn, maintaining relatively constant filament heating voltage as required for the operation of these fluorescent lamps.

The embodiment of FIG. 5 has been found to work best with a low power lamp load, i.e. usually less than about 40 watts, and a relatively high AC input voltage, i.e. 220 volts or above. However, at lower supply voltages or with higher load ratings, overheating of the cathode filaments might occur because the resonant circuit current may exceed the rating of the cathode filament. Accordingly, where desired, an alternate embodiment may be used which is somewhat more costly but which overcomes the above limitation. That embodiment is shown in FIG. 6.

Figure 6:
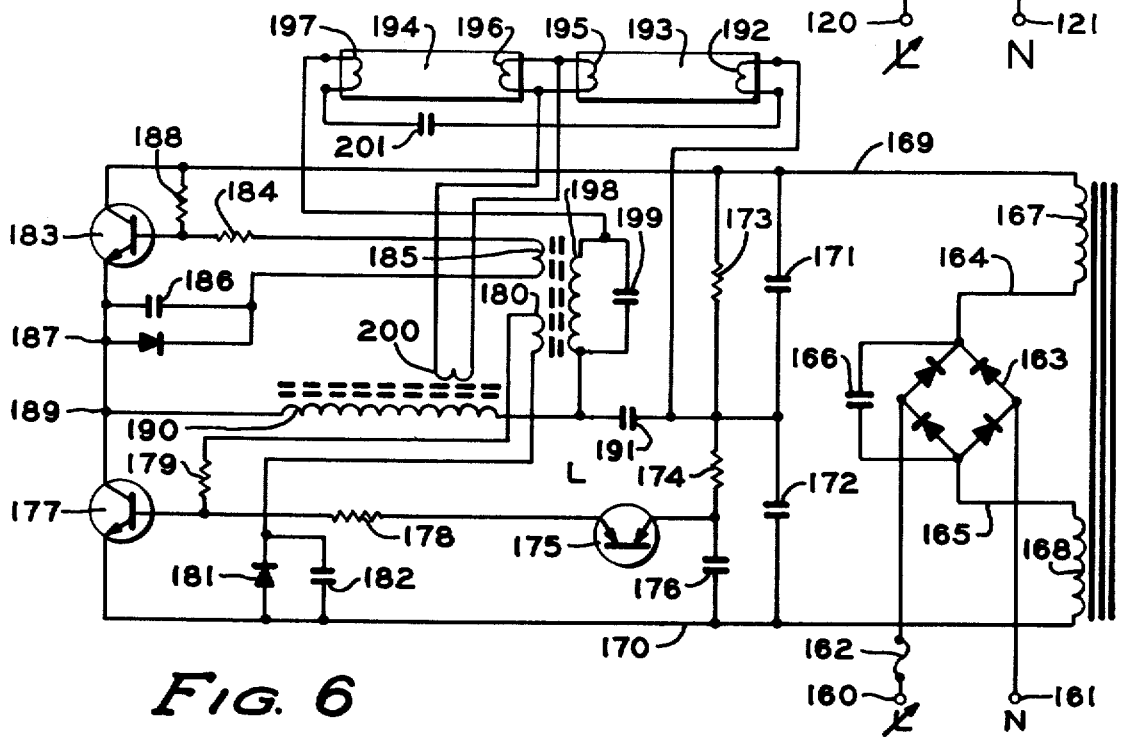
FIGS. 6 and 6 depict yet other embodiments of the present invention.

FIG. 6 depicts an alternate embodiment of the arrangement of FIG. 5. This system includes a source of variable AC power connected to terminals 160 and 161 with suitable current limiter 162 which, in turn, are connected to full wave bridge 163 having outputs at 164 and 165. As in the case of FIG. 5, a radio frequency interference filter capacitor 166 may be provided. The alternate rectified half waves 164 and 165 on the bridge 163 are connected through filter inductors 167 and 168 to respective output lines 169 and 170. Filter capacitors 171 and 172 along with shunt resistors 177 and 174 complete the DC filtering system. As in the case of FIG. 5, the circuit is self-oscillating and further includes a triggering element 175 with triggering capacitor 176 connected with the base of first oscillating transistor 177 through current limiting resistor 178. A positive feedback coil system is connected between the emitter and the base of transistor 177 which includes resistor 179 and coil 180 connected in series with diode 181, and capacitor 180 connected in parallel with diode 181. A second oscillating transistor 183 includes a similar positive feedback loop connected between its base and emitter including, in series, resistor 184, coil 185, and diode 186 connected in parallel with capacitor 187. An additional starting resistor is provided at 188. The transistors 177 and 183 are connected in series across the conductors 169 and 170 and have a common juncture 189 between the collector of transistor 177 and the emitter of transistor 183.

The main resonant inductor coil of the system 190 is connected in series with capacitor 191 between the juncture 189 and the filament 192 of the first fluorescent lamp 193 which is connected in series with a second lamp 194. The lamp 193 further includes a second filament 195 which, in turn, connect with a filament 196 of lamp 194 which also contains a final filament 197. The filament 197 is connected, in turn, to an additional resonant tuned circuit containing coil 198 and capacitor 199 which connects between inductor 190 and capacitor 191. A tuning capacitor 201 is connected across lamps 193 and 194 as shown. An auxiliary winding 200 may be connected across the common connection between filaments 195 and 196 to aid in maintaining the filament heating voltage during dimming. Capacitors 191 and 201 are utilized to split up the resonant current while providing tuned sinusoidal input to the lamps. This splitting effect prevents any over-current from damaging the lamp filament.

The tuned resonant circuit including elements 198 and 199 is constructed so as to have the same resonant frequency as the circuit including winding 190 and capacitors 191 and 200 and functions to prevent oscillation of the inverter when one or more lamps are removed during ballast operation. Thus where $\omega_0 = 2 \times$ the resonant frequency
L = inductance (henrys)
C = capacitance (farads)

$$\omega_0 = \frac{1}{\sqrt{L_{198}C_{199}}} = \frac{1}{\sqrt{L_{190}(C_{191} + C_{201})}}$$

Figure 7:
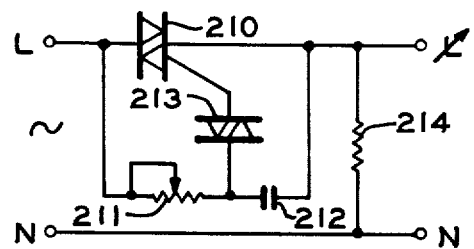
FIG. 7 is a schematic diagram of a prior art solid-state ballast utilizing a resonant bridge inverter.

Any suitable dimming circuit may be provided to vary the amplitude of the AC current input to the full wave rectifying system of any of FIGS. 4, 5, or 6. Such a system is illustrated in FIG. 7 and may include a solid-state semiconductor switch or triac 210 having one side connected to one side of the alternating current source L and the other side to the terminal N. A series combination of variable resistance 211 and capacitor 212 are connected across the triac 210, and a diac 213 is connected from the junction of variable resistance 211 and capacitor 212 to the gate terminal of triac 210. An additional resistor 214 is connected from the junction of triac 210 and terminal L to the junction of the other side of the alternating current source N in a well-known manner. These terminals, of course, interface with the corresponding terminals in the various solid-state ballast arrangements.

The arrangements of the present invention achieve essentially full-range dimming of the lamps while maintaining the advantages associated with a resonant bridge inverter by providing an essentially constant filament heating voltage at the fluorescent lamps.

The embodiments of the invention in which an exclusive property or right is claimed are defined as follows:

1. A two-wire electronic ballast arrangement for fluorescent lamp dimming comprising:
   a source of direct current;
   a source of variable square wave voltage; inverter means adapted to be fed by said source of direct current and modulated by said variable square wave voltage, said inverter means including resonant inductor-capacitor circuit means having inductive coil means and first capacitor means connected in series adapted to resonante at their natural frequency and to provide sinusoidal voltage across said capacitor means as the output of said inverter means to the fluorescent lamps;
   auxiliary winding means associated with said inductive coil means, said auxiliary winding means being adapted to be connected to the filaments of one or more fluorescent lamps for heating, such that the voltage supplied to heat the filaments of said one or more lamps remains substantially constant during dimming of said one or more fluorescent lamps, said fluorescent lamps further being adapted to be connected across said first capacitor means.

2. The apparatus of claim 1 wherein said source of variable square wave voltage is a pulse width modulated drive and said dimming is accomplished by varying the pulse width thereof.

3. The apparatus of claim 1 wherein said source of direct current is a full wave bridge rectifier.

4. The apparatus of claim 3 further comprising means for varying the alternating current input to said rectifier.

5. The apparatus of claim 1 wherein said inverter means further comprises:
 a pair of series connected transistors connected across said source of direct current, the emitter of one transistor being tied to the collector of the other;
 a pair of series connected filter capacitors connected across said source of direct current; and
 wherein one end of said inductor coil is connected to the junction of said series connected transistors, and the other end is connected to the junction of said filter capacitors through a resonating capacitor.

6. A two-wire electronic ballast arrangement for fluorescent lamp dimming comprising:
 a source of variable direct current power;
 inverter means adapted to be fed by said source of variable direct current power, said inverter means including resonant inductor-capacitor circuit means including inductive coil means and capacitor means connected in series adapted to resonate at their natural frequency and to provide sinusoidal voltage across said capacitor means as the output of said inverter means to the fluorescent lamps;
 auxiliary winding means associated with said inductive coil means, said auxiliary winding means being adapted to be connected to the filaments of one or more fluorescent lamps for heating disposed such that the voltage supplied to heat the filaments of said one or more lamps remains substantially constant during dimming of said one or more fluorescent lamps, said fluorescent lamps further being adapted to be connected across said capacitor means.

7. The apparatus of claim 6 wherein said source of direct current includes a full wave bridge adapted to be connected to a variable alternating current source and a filter circuit means to produce a filtered direct current output.

8. The apparatus of claim 6 wherein said inverter means is a self-oscillating, two-transistor inverter.

9. The apparatus of claim 8 wherein said self-oscillation system of said inverter means comprises:
 a triggering element for initially producing an input direct current to the base of a first transistor;
 positive feedback loops associated with said first and a second transistor means including feedback coil means and series diode means and capacitor means in parallel with said diode means, said positive feedback loops being connected between the base and emitter of each of said transistor means.

10. The apparatus of claim 6 further comprising clamping circuit means to limit circuit voltage and current upon removal of one or more of said lamps during operation of said system.

11. The apparatus of claim 10 wherein said clamping circuit further comprises a pair of series diodes connected across the conductors of said DC power and an inductor coil connected from the common of said series diodes and one of the conductors connecting said one or more lamps across said first capacitor means.

12. The apparatus of claim 7 including means for varying the alternating current source.

13. A two-wire electronic ballast arrangement for fluorescent lamp dimming comprising:
 a source of variable direct current;
 self-oscillating inverter means adapted to be fed by said source of variable direct current, said inverter means including a main resonant L-C circuit means having a main inductive coil means connected in series with a first capacitor means, said first capacitor means, being connected across the filaments of said one or more fluorescent lamps and second capacitor means connected in series with the filaments of said one or more fluorescent lamps;
 wherein said first and second capacitors are selected to resonate with the main inductor to provide tuned sinusoidal input to said one or more fluorescent lamps at substantially the natural frequency of the circuit;
 auxiliary tuned circuit means having parallel-connected inductor and capacitor means connected across said first capacitor means in series with said one or more fluorescent lamps wherein said auxiliary tuned circuit means is tuned to the same frequency as the input to said one or more fluorescent lamps and adapted to prevent oscillation of said inverter upon removal of any of said lamps during operation of the ballast.

14. The apparatus of claim 13 including a plurality of series connected fluorescent lamps, said apparatus further comprising:
 auxiliary secondary winding means connected across the commonly connected filaments of said series connected fluorescent lamps, said auxiliary secondary winding being adapted to substantially maintain the filaments heating voltage during diming of said lamps.

15. The apparatus of either of claims 13 or 14 wherein said self-oscillating inverter means includes a plurality of series connected transistor means having positive feedback coils associated with each transistor means which share a common core with the inductor of said auxiliary tuned circuit such that oscillation of said inverter stops when a lamp is removed during the operation of the ballast.

16. The apparatus of claim 15 wherein said self-oscillating system of said inverter further comprises:
 a triggering element for initially producing an input of direct current to the base of first transistor of a pair of series connected transistor means; and
 starting resistor means associated with the second transistor of said pair of transistor means.

17. The apparatus of either of claims 13 or 14 wherein said source of variable DC current is a full-wave bridge rectifier.

18. The apparatus of claim 17 including means for varying the AC input to said rectifier to accomplish dimming of said lamps.

19. A two-wire electronic ballast arrangement for fluorescent lamp dimming comprising:

a source of variable direct current power;

inverter means adapted to be fed by said source of variable direct current electric power, said inverter means including resonant inductor-capacitor circuit means having inductive coil means adapted to be connected in series with the filaments of one or more fluorescent lamps and capacitor means connected in series with said inductor means and in series with the terminals of the filaments of each of said fluorescent lamps;

wherein said capacitors are adapted to resonate with the inductor at about the natural frequency of the circuit, prevents substantial variation in the heating voltage to the cathode filaments of said one or more lamps, and prevents over-voltage and over-current in the circuit should one or more lamps be removed during the operation thereof.

20. The apparatus of claim 19 wherein said source of direct current includes a full wave bridge adapted to be connected to a variable alternating current source and a filter circuit means to produce a filtered direct current output.

21. The apparatus of claim 20 including means for varying the alternating current source.

22. The apparatus of claim 19 wherein said inverter means is a self-oscillating, two-transistor inverter.

23. The apparatus of claim 22 wherein said self-oscillation system of said inverter means comprises:

a triggering element for initially producing an input of direct current to the base of a first transistor;

positive feedback loops associated with said first and a second transistor means including feedback coil means and series diode means in parallel with said coil means, said positive feedback loops being connected between the base and emitter of each of said transistor means.

* * * * *